(12) United States Patent
Yang

(10) Patent No.: US 9,141,375 B2
(45) Date of Patent: *Sep. 22, 2015

(54) UPDATE PACKAGE GENERATION BASED ON ANALYSIS OF BANK DEPENDENCY

(75) Inventor: Xuguang Yang, Sunnyvale, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 1092 days.

This patent is subject to a terminal disclaimer.

(21) Appl. No.: 12/030,757

(22) Filed: Feb. 13, 2008

(65) Prior Publication Data

US 2008/0148251 A1    Jun. 19, 2008

Related U.S. Application Data

(63) Continuation of application No. 10/887,490, filed on Jul. 8, 2004, now Pat. No. 7,343,443.

(60) Provisional application No. 60/485,554, filed on Jul. 8, 2003.

(51) Int. Cl.
*G06F 9/44* (2006.01)
*G06F 9/445* (2006.01)

(52) U.S. Cl.
CPC . *G06F 8/68* (2013.01); *G06F 8/665* (2013.01)

(58) Field of Classification Search
None
See application file for complete search history.

(56) References Cited

U.S. PATENT DOCUMENTS

| | | | |
|---|---|---|---|
| 5,084,816 A | 1/1992 | Boese et al. | |
| 5,261,055 A | 11/1993 | Moran et al. | |
| 5,442,771 A | 8/1995 | Filepp et al. | |
| 5,479,637 A | 12/1995 | Lisimaque et al. | |
| 5,579,522 A | 11/1996 | Christeson et al. | |
| 5,596,738 A | 1/1997 | Pope | |
| 5,598,534 A | 1/1997 | Haas | |
| 5,608,910 A | 3/1997 | Shimakura | |
| 5,623,604 A | 4/1997 | Russell et al. | |
| 5,666,293 A | 9/1997 | Metz et al. | |
| 5,752,039 A | 5/1998 | Tanimura | |
| 5,778,440 A | 7/1998 | Yiu et al. | |
| 5,790,974 A | 8/1998 | Tognazzini | |

(Continued)

FOREIGN PATENT DOCUMENTS

| | | |
|---|---|---|
| CA | 2339923 | 3/2000 |
| EP | 0717353 | 6/1996 |

(Continued)

OTHER PUBLICATIONS

"Notice of Reasons for Rejection", Japanese Office Action Reference No. B027803, Mailing No. 415807, Mailing Date Nov. 8, 2005 for Patent Application No. 2002-543291, with English Translation, pp. 1-13.

(Continued)

*Primary Examiner* — Yaima Rigol
(74) *Attorney, Agent, or Firm* — Kilpatrick Townsend & Stockton LLP

(57) ABSTRACT

Aspects of the present invention may be seen in an electronic device network that employs a generator to generate update packages and a corresponding update agent in the electronic device to update its firmware/software. The generator may employ bank order dependency analysis techniques to determine optimum bank orders. The generator may make use of an optimum bank order to generate update packages that are efficient and compact.

16 Claims, 6 Drawing Sheets

(56) References Cited

U.S. PATENT DOCUMENTS

| | | | |
|---|---|---|---|
| 5,832,520 A * | 11/1998 | Miller | 1/1 |
| 5,878,256 A | 3/1999 | Bealkowski et al. | |
| 5,960,445 A | 9/1999 | Tamori et al. | |
| 5,968,182 A | 10/1999 | Chen et al. | |
| 6,009,497 A | 12/1999 | Wells et al. | |
| 6,018,747 A | 1/2000 | Burns et al. | |
| 6,038,636 A | 3/2000 | Brown, III et al. | |
| 6,064,814 A | 5/2000 | Capriles et al. | |
| 6,073,206 A | 6/2000 | Piwonka et al. | |
| 6,073,214 A | 6/2000 | Fawcett | |
| 6,080,207 A | 6/2000 | Kroening et al. | |
| 6,088,759 A | 7/2000 | Hasbun et al. | |
| 6,105,063 A | 8/2000 | Hayes, Jr. | |
| 6,112,024 A | 8/2000 | Almond et al. | |
| 6,112,197 A | 8/2000 | Chatterjee et al. | |
| 6,126,327 A | 10/2000 | Bi et al. | |
| 6,128,695 A | 10/2000 | Estakhri et al. | |
| 6,138,249 A | 10/2000 | Nolet | |
| 6,157,559 A | 12/2000 | Yoo | |
| 6,163,274 A | 12/2000 | Lindgren | |
| 6,198,946 B1 | 3/2001 | Shin et al. | |
| 6,199,204 B1 | 3/2001 | Donohue | |
| 6,209,127 B1 | 3/2001 | Mori et al. | |
| 6,279,153 B1 | 8/2001 | Bi et al. | |
| 6,292,934 B1 | 9/2001 | Davidson et al. | |
| 6,301,710 B1 | 10/2001 | Fujiwara | |
| 6,311,322 B1 | 10/2001 | Ikeda et al. | |
| 6,334,212 B1 | 12/2001 | Nakajima | |
| 6,343,379 B1 | 1/2002 | Ozawa et al. | |
| 6,381,740 B1 | 4/2002 | Miller et al. | |
| 6,408,434 B1 | 6/2002 | Fujiwara | |
| 6,425,125 B1 * | 7/2002 | Fries et al. | 717/168 |
| 6,438,585 B2 | 8/2002 | Mousseau et al. | |
| 6,526,574 B1 | 2/2003 | Jones | |
| 6,615,038 B1 | 9/2003 | Moles et al. | |
| 6,615,404 B1 | 9/2003 | Garfunkel et al. | |
| 6,668,336 B2 | 12/2003 | Lasser | |
| 6,725,056 B1 | 4/2004 | Moles et al. | |
| 6,725,392 B1 | 4/2004 | Frey et al. | |
| 6,832,373 B2 | 12/2004 | O'Neill | |
| 6,836,657 B2 | 12/2004 | Ji et al. | |
| 6,925,467 B2 | 8/2005 | Gu et al. | |
| 6,928,108 B2 | 8/2005 | Nelson et al. | |
| 6,970,917 B1 | 11/2005 | Kushwaha et al. | |
| 7,343,443 B1 | 3/2008 | Yang | |
| 2001/0029178 A1 | 10/2001 | Criss et al. | |
| 2001/0047363 A1 | 11/2001 | Peng | |
| 2001/0048728 A1 | 12/2001 | Peng | |
| 2002/0034105 A1 * | 3/2002 | Kulkarni et al. | 365/200 |
| 2002/0039394 A1 | 4/2002 | Buchwald et al. | |
| 2002/0069259 A1 | 6/2002 | Kushwaha et al. | |
| 2002/0072359 A1 | 6/2002 | Moles et al. | |
| 2002/0078209 A1 | 6/2002 | Peng | |
| 2002/0112046 A1 | 8/2002 | Kushwaha et al. | |
| 2002/0112047 A1 | 8/2002 | Kushwaha et al. | |
| 2002/0116261 A1 | 8/2002 | Moskowitz et al. | |
| 2002/0131404 A1 | 9/2002 | Mehta et al. | |
| 2002/0152005 A1 | 10/2002 | Bagnordi | |
| 2002/0156863 A1 | 10/2002 | Peng | |
| 2002/0157090 A1 | 10/2002 | Anton, Jr. | |
| 2003/0023964 A1 | 1/2003 | Rajaram et al. | |
| 2003/0027563 A1 | 2/2003 | Herle et al. | |
| 2003/0033599 A1 | 2/2003 | Rajaram et al. | |
| 2003/0037075 A1 | 2/2003 | Hannigan et al. | |
| 2003/0061384 A1 | 3/2003 | Nakatani | |
| 2003/0074658 A1 | 4/2003 | Kim | |
| 2003/0084435 A1 | 5/2003 | Messer et al. | |
| 2003/0121032 A1 | 6/2003 | Cho et al. | |
| 2003/0162533 A1 | 8/2003 | Moles et al. | |
| 2003/0186689 A1 | 10/2003 | Herle et al. | |
| 2004/0015952 A1 | 1/2004 | Lajoie et al. | |
| 2004/0031031 A1 | 2/2004 | Rudelic | |
| 2004/0034853 A1 | 2/2004 | Gibbons et al. | |
| 2004/0054995 A1 | 3/2004 | Lee | |
| 2004/0111723 A1 | 6/2004 | Moles et al. | |
| 2004/0117785 A1 | 6/2004 | Kincaid | |
| 2004/0123282 A1 | 6/2004 | Rao | |
| 2004/0133887 A1 | 7/2004 | Herle et al. | |
| 2004/0152455 A1 | 8/2004 | Herle | |
| 2004/0261072 A1 | 12/2004 | Herle | |
| 2004/0261073 A1 | 12/2004 | Herle et al. | |
| 2005/0055684 A1 | 3/2005 | Rao et al. | |
| 2005/0060699 A1 | 3/2005 | Kim et al. | |
| 2005/0097544 A1 | 5/2005 | Kim | |
| 2005/0144609 A1 | 6/2005 | Rothman et al. | |
| 2005/0144612 A1 | 6/2005 | Wang et al. | |
| 2005/0160195 A1 | 7/2005 | Bruner et al. | |
| 2005/0216902 A1 | 9/2005 | Schaefer | |
| 2005/0216903 A1 | 9/2005 | Schaefer | |

FOREIGN PATENT DOCUMENTS

| | | |
|---|---|---|
| JP | 7160490 | 6/1995 |
| JP | 7219780 | 8/1995 |
| JP | 8202626 | 8/1996 |
| JP | 8255104 | 10/1996 |
| JP | 11003223 | 1/1999 |
| JP | 11272454 | 10/1999 |
| JP | 11345127 | 12/1999 |
| KR | 20020034228 | 5/2000 |
| KR | 2001010100328 | 11/2001 |
| WO | PCT US01 44034 | 11/2001 |
| WO | WO-0241147 A1 | 5/2002 |

OTHER PUBLICATIONS

"Transcript of Decision of Final Rejection", Japanese Office Action Reference No. B027803, Mailing No. 236268, Mailing Date Jun. 6, 2006 for Patent Application No. 2002-543291, with English Translation, pp. 1-10.

Computer Dictionary, Microsoft Press, Third Edition, pp. 88, 190, (1997).

Muller, Nathan J., "Focus on OpenView a Guide to Hewlett-Packard's Network and Systems Management Platform", (1995), CBM Books, pp. 1-291.

Jing, J., et al., "Client Server Computing in Mobile Environments", ACM Computing Surveys, (Jul. 1999), pp. 117-159, vol. 31, Issue 2, ACM Press.

Hadjiefthymiades, S. et al., "ESW4: enhanced scheme for WWW computing in wireless communication environments", ACM SIGCOMM Computer Communication Review (Oct. 1999), pp. 24-35, vol. 29, Issue 5, ACM Press.

Sevanto, J. et al., "Introducing quality-of-service and traffic classes in wireless mobile networks", Proceedings of the 1st ACM International workshop on Wireless mobile multimedia (1999), pp. 21-29, ACM Press.

Fasbender, A. et al., "Any Network, Any Terminal, Anywhere", IEEE Personal Communications (Apr. 1999), pp. 22-30, IEEE Press.

* cited by examiner

|  | Old 1 | 2 | 3 |
|---|---|---|---|
| New 1 | 500 | 200 | 30 |
| 2 |  | 100 | 400 |
| 3 | 20 | 150 |  |

UPDATE PACKAGE GENERATION BASED ON ANALYSIS OF BANK DEPENDENCY

RELATED APPLICATIONS

The present application is a continuation application of U.S. patent application Ser. No. 10/887,490, filed on Jul. 8, 2004, now U.S. Pat. No. 7,343,443 which makes reference to, claims priority to and claims benefit from U.S. Provisional Patent Application Ser. No. 60/485,554, entitled "Update Package Generation by a Generator Based on Analysis of Bank Dependency," filed on Jul. 8, 2003.

The complete subject matter of each of the above-referenced United States Patent Applications is hereby incorporated herein by reference, in its entirety. In addition, this application makes reference to U.S. Provisional Patent Application Ser. No. 60/249,606, entitled "System and Method for Updating and Distributing Information," filed Nov. 17, 2000, and International Patent Application Publication No. WO 02/41147 A1, entitled "Systems And Methods For Updating And Distributing Information," publication date Mar. 23, 2002, the complete subject matter of each of which is hereby incorporated herein by reference, in its entirety. With respect to the present application, Applicant hereby rescinds any disclaimer of claim scope made in the parent application or any predecessor or related application. The Examiner is advised that any previous disclaimer of claim scope, if any, and the alleged prior art that it was made to allegedly avoid, may need to be revisited. Nor should a disclaimer of claim scope, if any, in the present application be read back into any predecessor or related application.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs or to introduce new features, or both.

Electronic devices may use update packages containing information necessary to update firmware/software in electronic devices. Wireless networks may be used to determine the optimal size of update packages based on size or other characteristics. Wireless networks may be utilized to determine such optimal size in manageable and reasonable, if not in deterministic time.

Generally, creating efficient and compact update packages for firmware/software updates can be challenging. Creating updates as update packages, wherein difference information between an old version and a new version of the firmware/software is expressed using a specialized and efficient instruction set can also be challenge. Creating an update agent that can process these update packages efficiently on the mobile handset can also introduce a great challenge. Furthermore, creating such solutions that can work in different wireless networks can also be problematic.

Further limitations and disadvantages of conventional and traditional approaches will become apparent to one of ordinary skill in the art through comparison of such systems with the present invention.

BRIEF SUMMARY OF THE INVENTION

Aspects of the present invention may be found in a method for determining an optimal order of updating a plurality of memory banks in an electronic device. The updating of a memory bank may comprise storing into the memory bank being updated one of updating information received via a communication network and copies of information already present in the plurality of memory banks. The method may comprise selecting a predetermined portion of the plurality of memory banks, determining the optimal order of updating the selected memory banks, adding a previously unselected memory bank of the plurality of memory banks to the determined optimal order of the selected memory banks. The method may repeat until all of the plurality of memory banks are in the determined optimal order. The predetermined portion may comprise two memory banks. The optimal order may maximize the use of copies of information already present in the plurality of memory banks in the electronic device, and may minimize the volume of updating information received via a communication network.

In various embodiments of the present invention, the electronic device may be portable, and may comprise one of a cellular phone, a personal digital assistant (PDA), a pager, and a personal computer. The received information may comprise a set of executable instructions for converting a first version of code to a second version of code, in the electronic device. The electronic device may be communicatively coupled via the communication network to generator software that generates the updating information. The communication network may comprise a cellular telephone network, a paging network, and a wireless packet network. In an embodiment of the present invention, adding may comprise constructing a first of a plurality of bank orders by inserting the previously unselected memory bank of the plurality of memory banks before the first memory bank in the determined optimal order of the selected memory banks. Adding may also comprise constructing a second of the plurality of bank orders by adding the previously unselected memory bank of the plurality of memory banks after the last memory bank in the determined optimal order of the selected memory banks. In addition, adding may comprise constructing each of the remainder of the plurality of bank orders by inserting the previously unselected memory bank of the plurality of memory banks between each pair of memory banks in the determined optimal order of the selected memory banks. In an embodiment in accordance with the present invention, adding may also comprise calculating a cost of updating for each of the plurality of bank orders, to determine an optimal order of updating. Constructing may also comprise performing a circular shift of the determined optimal order of the selected memory banks. The cost of updating may comprise one of an amount of updating information used and a number of executable instructions used, in the updating.

Additional aspects of the present invention may be seen in a machine-readable storage having stored thereon, a computer program having at least one code section being executable by a machine for causing the machine to perform the above.

Further aspects of the present invention may be observed in a system capable of determining an optimal order of updating a plurality of memory banks in an electronic device. The updating of a memory bank may comprise storing into the memory bank being updated one of updating information received via a communication network and copies of information already present in the plurality of memory banks. Such a system may comprise at least one processor capable of selecting a predetermined portion of the plurality of memory banks. The at least one processor may capable of determining the optimal order of updating the selected memory banks, and of adding a previously unselected memory bank of the plurality of memory banks to the determined optimal order of the selected memory banks. The at least one processor may be capable of repeating the determining and adding until all of the plurality of memory banks are in the determined optimal order. The predetermined portion may comprise two memory banks. The optimal order may maximize the use of copies of information already present in the plurality of memory banks in the electronic device, and may minimize the volume of updating information received via a communication network.

In various embodiments in accordance with the present invention, the electronic device may be portable, and may comprise one of a cellular phone, a personal digital assistant (PDA), and a personal computer. The received information may comprise a set of executable instructions for converting a first version of code to a second version of code, in the electronic device. The electronic device may be communicatively coupled via the communication network to generator software that generates the updating information, and the communication network may comprise a cellular telephone network, a paging network, and a wireless packet network. Adding may comprise constructing a first of a plurality of bank orders by inserting the previously unselected memory bank of the plurality of memory banks before the first memory bank in the determined optimal order of the selected memory banks. Adding may also comprise constructing a second of the plurality of bank orders by adding the previously unselected memory bank of the plurality of memory banks after the last memory bank in the determined optimal order of the selected memory banks. In addition, adding may comprise constructing each of the remainder of the plurality of bank orders by inserting the previously unselected memory bank of the plurality of memory banks between each pair of memory banks in the determined optimal order of the selected memory banks. Adding may further comprise calculating a cost of updating for each of the plurality of bank orders, to determine an optimal order of updating. The constructing may comprise performing a circular shift of the determined optimal order of the selected memory banks, and the cost of updating may comprise one of an amount of updating information used and a number of executable instructions used, in the updating.

These and other features and advantages of the present invention may be appreciated from a review of the following detailed description of the present invention, along with the accompanying figures in which like reference numerals refer to like parts throughout.

DETAILED DESCRIPTION OF THE INVENTION

The present invention relates generally to generating updates of firmware/software components in electronic devices such as, for example, mobile handsets using an update agent, and specifically to the use of size optimization techniques in the generation of update packages that contain difference information. Although the following discusses aspects of the invention in terms of a mobile handset, it should be clear that the following also applies to other mobile electronic devices such as, for example, personal digital assistants (PDAs), pagers, personal computers (PCs), and similar handheld electronic devices.

Figure 1:
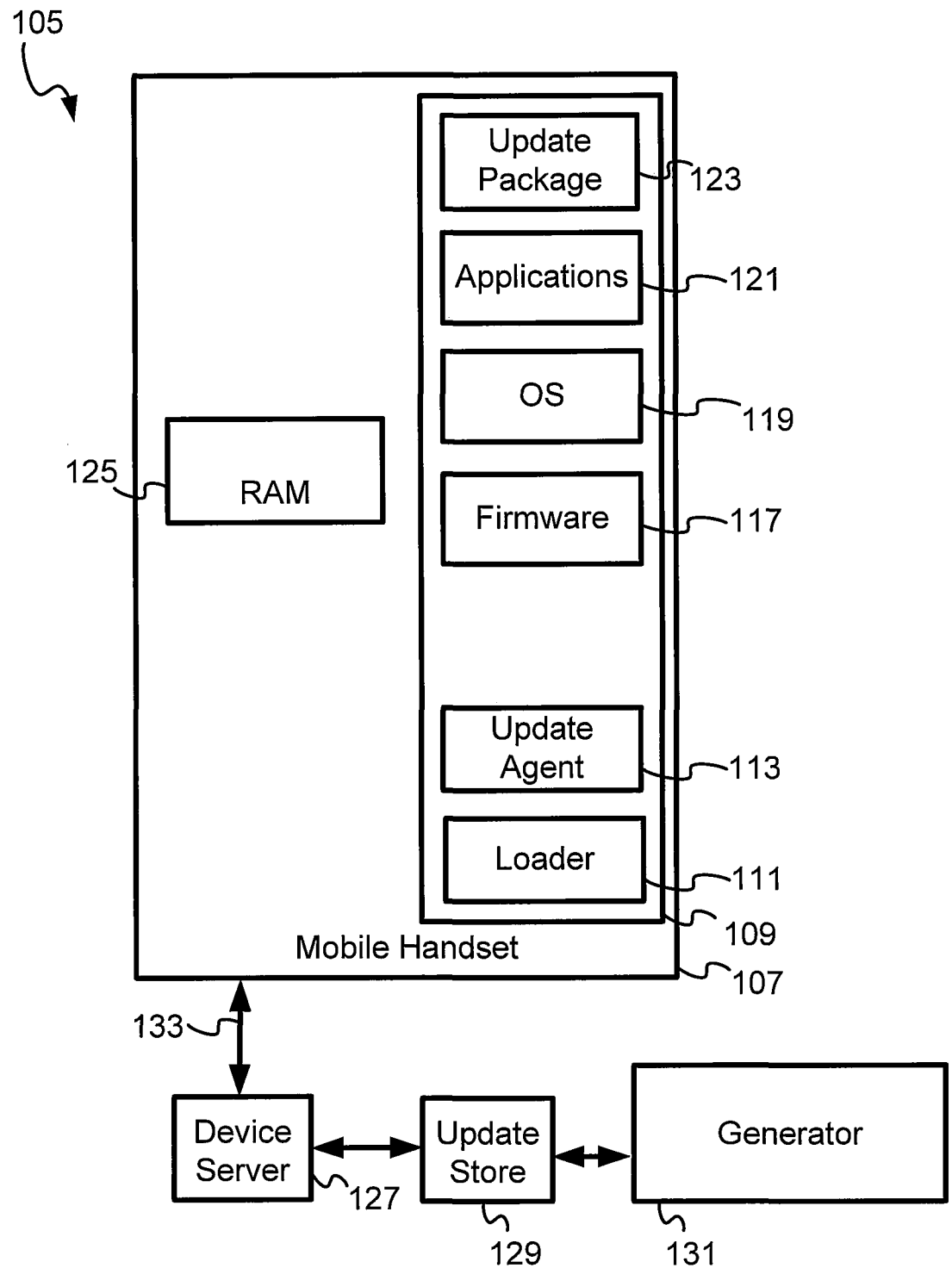
FIG. 1 illustrates a block diagram of an exemplary update system for facilitating firmware/software updates in a mobile handset, in accordance with an embodiment of the present invention.

FIG. 1 illustrates a block diagram of an exemplary update system 105 for facilitating firmware/software updates in a mobile handset 107, in accordance with an embodiment of the present invention. The update system 105 may comprise a mobile handset 107 communicatively coupled via communication network 133 to a device server 127. The mobile handset 107 may comprise, for example, a cellular phone, a personal digital assistant, a pager, or a personal computer. In various embodiments of the present invention, the communication network 133 may comprise, for example, a cellular telephone network, a paging network, and a wireless packet network. The device server 127 may be communicatively coupled to an update store 129, which may be communicatively coupled to a generator 131. The generator 131 may comprise software for producing an update package usable for updating the mobile handset 107 from a first firmware version and a second firmware version. The term "code" may also used to represent the firmware/software in an electronic device such as, for example, the mobile handset 107.

In an embodiment of the present invention, the update system 105 may dispense update packages generated by the generator 131 to the mobile handset 107. The mobile handset 107 may employ the dispensed update packages to update firmware and/or software. In an embodiment of the present invention, an update package may comprise executable instructions used to convert firmware/software (i.e., code) in the mobile handset 107 from one version to another.

In an embodiment of the present invention, the mobile handset 107 may comprise a random access memory (RAM) unit 125 and a non-volatile memory 109. The non-volatile memory 109 may have a plurality of components such as, for example, a loader 111, an update agent 113, firmware 117, an operating system (OS) 119, applications 121, and an update package 123.

In an embodiment of the present invention, the mobile handset 107 may be capable of updating firmware 117 and/or software 119, 121 employing an update package 123. The update package 123 may be generated by the generator 131, and stored in the update store 129 for retrieval by the device server 127.

For the purpose of updating, the memory of the mobile handset 107 may be logically and/or physically arranged into a collection of banks. The generator 131 may be capable of generating update packages based on an optimum bank update order, or "bank order". In an embodiment of the present invention, the generator 131 may be capable of determining the optimum bank order. In another embodiment of the present invention, another component of the update system 105 may be capable of determining the optimum bank order.

In an embodiment of the present invention, the generator 131 may employ a technique for processing content to create update packages. The content may be, for example, an older or first version of firmware/software, and a newer or second version of the same firmware/software. The created update packages may be employed by the mobile handset 107 to update the associated firmware/software in the mobile handset 107.

In an embodiment of the present invention, the size of a generated update package may depend upon the bank order of the update of the banks of memory image for the mobile handset 107, the bank order used by mobile handset 107 to update a plurality of banks of a non-volatile memory 109 in the mobile handset 107 as part of an update process. The generator 131 may employ bank order dependency analysis techniques to determine optimum bank orders. In an embodiment of the present invention, the generator 131 may make use of an optimum bank order to generate update packages such as, for example, update package 123, that are efficient and compact such that they may be smaller in size and easier to distribute.

In an embodiment of the present invention, the update package 123 may comprise instructions from a specialized instruction set, and associated data. The specialized instruction set may include instructions such as, for example, COPY and SET instructions. In an embodiment of the present invention, a SET instructions may specify data to be stored in an area of memory being updated. In certain situations, SET instructions may constitute the bulk of the contents, in terms of size or volume, of a generated update package. A COPY instructions, on the other hand, may copy the existing contents of designated areas of the memory of an electronic device to areas of memory currently being updated. For a given amount of memory to be updated, a COPY instruction may be more efficient than a SET instruction, because the COPY instruction uses information already available in the memory of the electronic device being updated. In contrast, SET instructions are accompanied by data values not already available somewhere in the memory of the device being updated. Updating using SET instructions, therefore may involve communicating to the electronic device not only the SET instruction, but also the data values used in updating memory. Thus, reducing the size or volume of an update package may involve reducing the number of SET instructions and/or reducing the amount of data that may need to be set in the SET instructions. In an embodiment of the present invention, the overall size of the number of bytes used in SET instructions may be reduced by optimization techniques that may be employed by the bank order-based generator 131. In another embodiment of the present invention, the number of SET instructions may be minimized by such optimization. In yet another embodiment of the present invention, both the number of SET instructions and the average number of bytes employed by each of the SET instructions may be minimized by the generator 131 using such bank order-based optimizations.

In an embodiment of the present invention, an optimal update technique may be employed to maximize the amount of memory updated using COPY instructions, and to minimize the amount of memory updated using SET instructions.

In an embodiment of the present invention, the use of COPY-type instructions causes the updating of some banks of memory to be dependent upon the updating of other banks of memory. The ability to use the COPY instruction in performing an update of memory depends upon whether the values needed for the update are available to be copied. For example, a table of data values that is located in one bank of memory in an old version of firmware may be located, unchanged, in a different bank of memory in the new version of the firmware. Selecting a bank order that allows the update operation to copy the table of data values from the old bank to the new bank permits the use of a COPY-type instruction, and involves no addition accompanying data. On the other hand, choosing a bank order that results in the prior destruction (e.g., by an earlier COPY or SET update operation) of the bank containing the data values of the table before the update of the bank containing the new location of the table results in the use of a SET-type instruction, and additional accompanying data.

The number of different bank orders that may be used for an update varies depending upon the number of banks of memory being updated. Updating memory according to the various bank orders may result in the use of different mixes of COPY and SET instructions, and therefore different amounts of accompanying data. An embodiment of the present invention may operate so as to minimize the size or volume of the update package produced, by minimizing the number of SET instructions used. Another embodiment of the present invention may operate in a manner that minimizes the amount of backup flash space needed for the update.

Figure 2A:
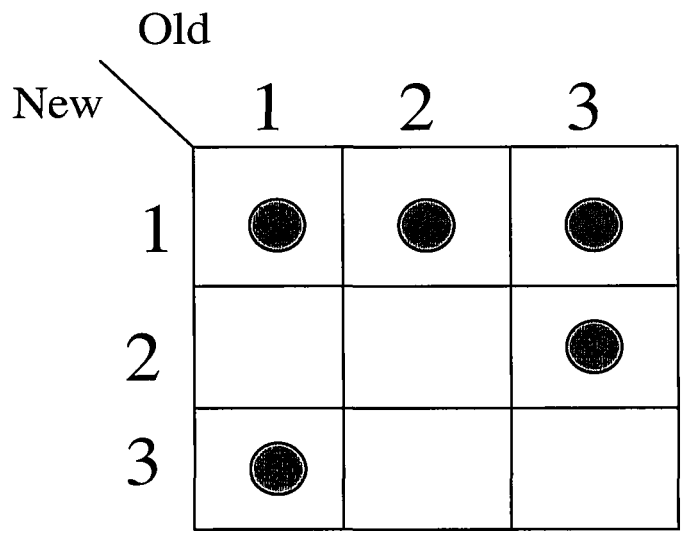
FIG. 2A illustrates exemplary inter-dependencies among banks of an old version and a new version of firmware, in accordance with an embodiment of the present invention.

FIG. 2A illustrates exemplary inter-dependencies among banks of an old version and a new version of firmware, in accordance with an embodiment of the present invention. For example, the new bank 1 may depend on the old banks 1, 2, and 3; the new bank 2 may depend on the old bank 3; and the new bank 3 may depend on the old bank 1.

Figure 2B:
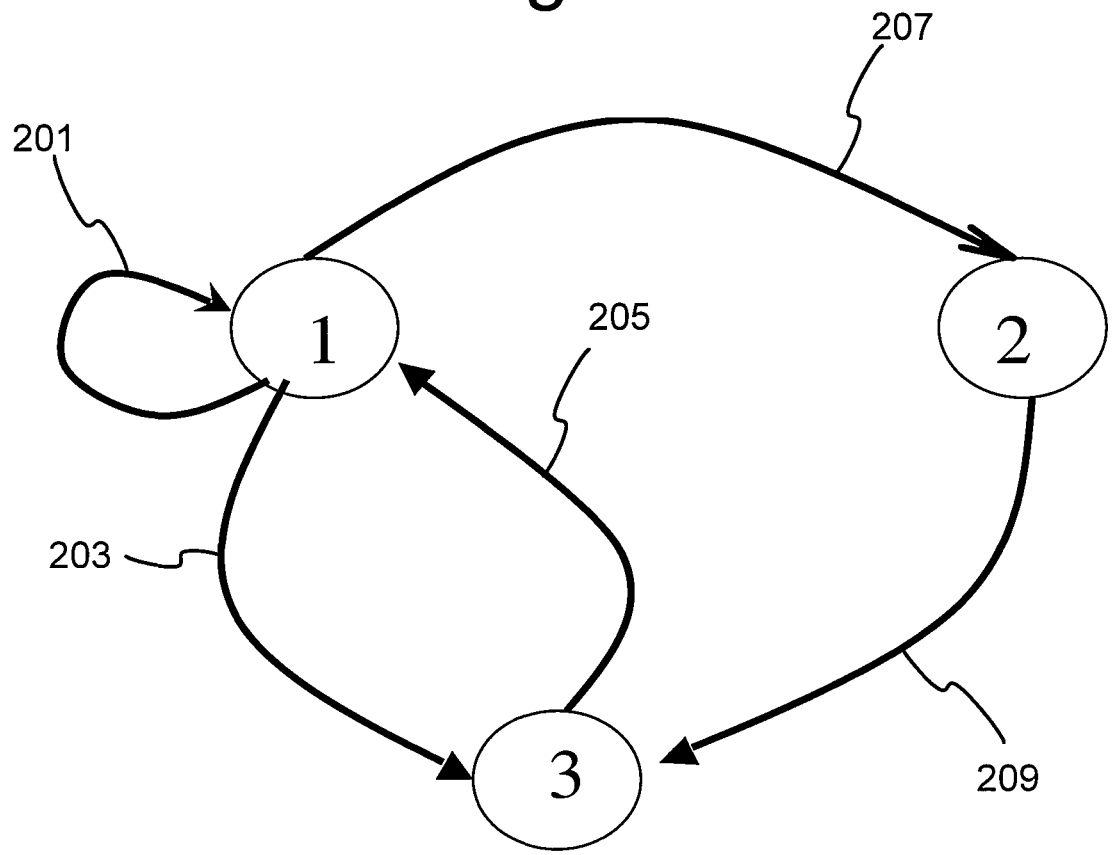
FIG. 2B shows a directed graph that illustrates the exemplary inter-dependencies among the banks of FIG. 2A, in accordance with an embodiment of the present invention.

FIG. 2B shows a directed graph that illustrates the exemplary inter-dependencies among the banks of FIG. 2A, in accordance with an embodiment of the present invention. Depending on oneself such as, for example, the new bank 1 depending on the old bank 1 may not cause a problem, as such, and self-loops such as, for example, self-loop 201 may be ignored. Loops may then be identified in the graph. In this example, there are two loops in the graph, loop 1 and 3 defined by arrows 203 and 205, and loop 1, 2, and 3 defined by arrows 205, 207 and 209. To update banks that are part of a loop, the dependency may be overcome by backing up one bank. The number of banks that may need to be backed up simultaneously may be equal to the maximum number of loops traversing any single node. For example, both banks 1 and 3 are involved in two loops, so two backup bank spaces may be needed for the banks of FIG. 2B.

Figure 2C:
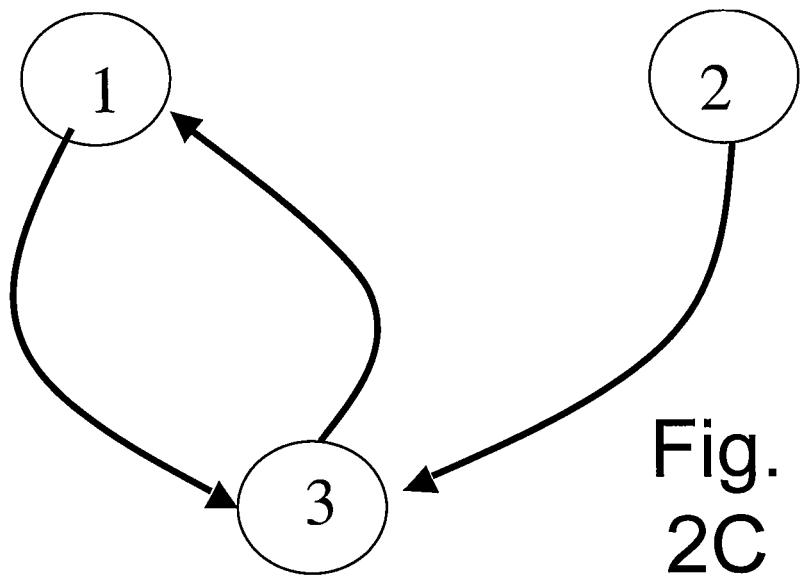
FIG. 2C shows a directed graph that illustrates another exemplary inter-dependencies relationship among banks 1, 2, and 3, in accordance with an embodiment of the present invention.

FIG. 2C shows a directed graph that illustrates another exemplary inter-dependencies relationship among banks 1, 2, and 3, in accordance with an embodiment of the present invention. In this example, there is only one loop, which is loop 1 and 3. Therefore, one backup bank space may be needed for the banks of FIG. 2C.

Figure 2D:
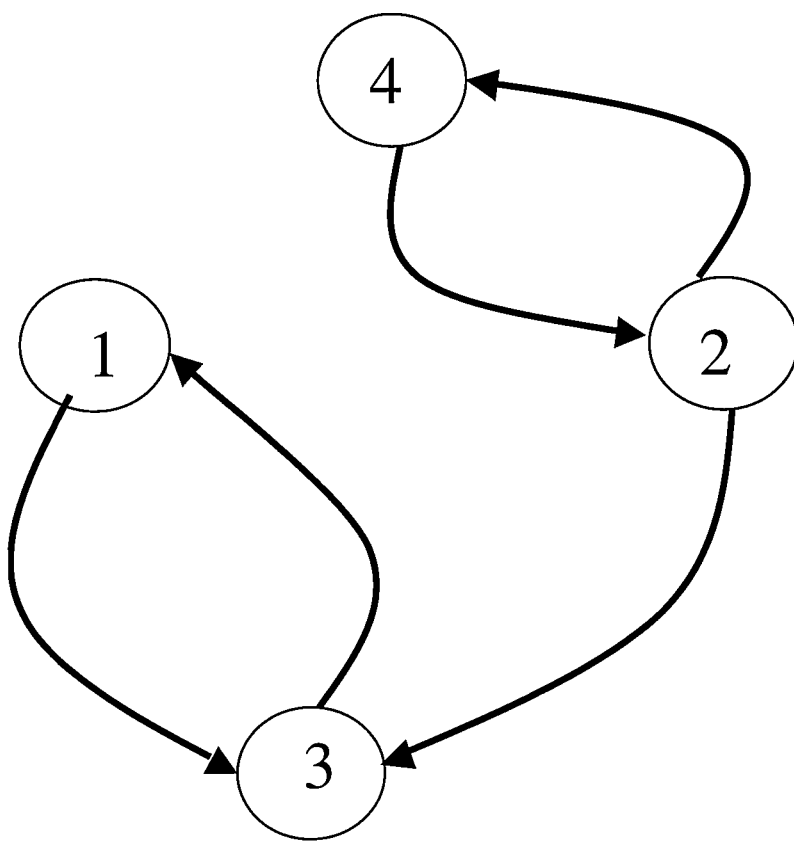
FIG. 2D shows a directed graph that illustrates yet another exemplary inter-dependencies relationship among banks 1, 2, 3, and 4, in accordance with an embodiment of the present invention.

FIG. 2D shows a directed graph that illustrates yet another exemplary inter-dependencies relationship among banks 1, 2, 3, and 4, in accordance with an embodiment of the present invention. In this example, there are two loops in the graph, loop 1 and 3, and loop 2 and 4. The two loops, however, do not traverse any common node; therefore, one backup space may be sufficient for the banks.

Figures 3A, 3B:
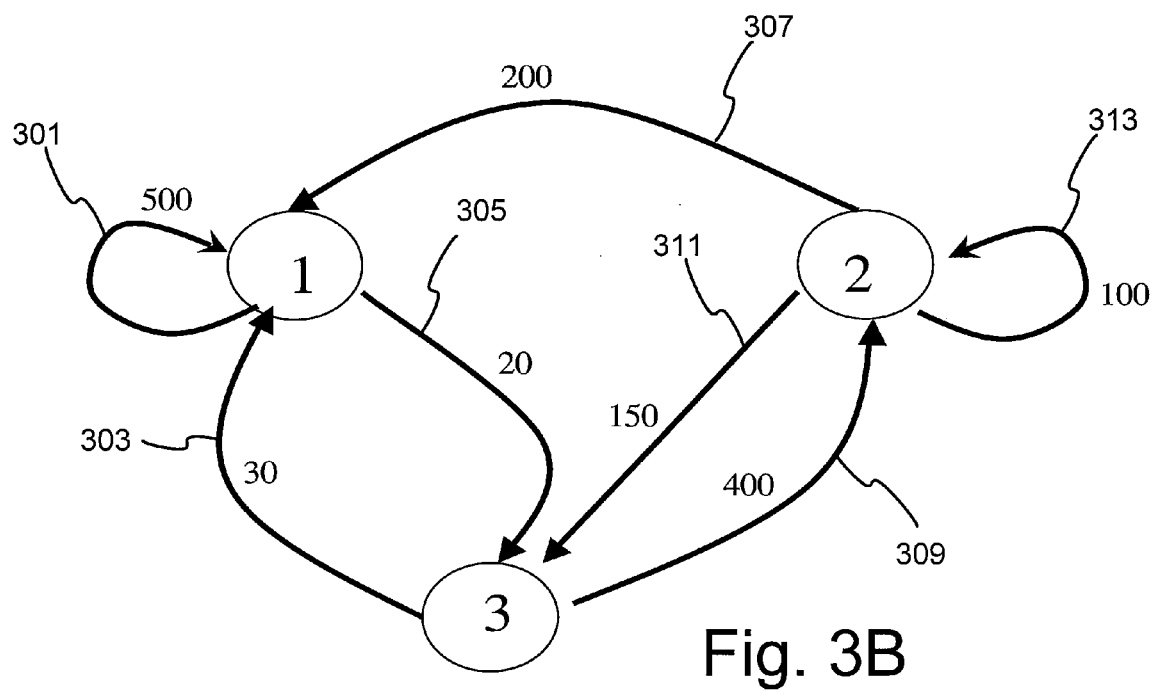
FIG. 3A illustrates exemplary inter-dependencies among banks of an old version and a new version of firmware, in accordance with an embodiment of the present invention.
FIG. 3B shows a directed graph that illustrates the exemplary inter-dependencies relationships among the banks of FIG. 3A, in accordance with an embodiment of the present invention.

An embodiment of the present invention may find an optimal update order, where optimal may mean, for example, including the least amount of data accompanying SET instructions. FIG. 3A illustrates exemplary inter-dependencies among banks of an old version and a new version of firmware, in accordance with an embodiment of the present invention. For example, the new bank 1 may depend on the old banks 1, 2, and 3, where the new bank 1 utilizes 500 bytes from the old bank 1, 200 bytes from the old bank 2, and 30 bytes from the old bank 3. Similarly, the new bank 2 may depend on the old banks 2 and 3, where the new bank 2 utilizes 100 bytes from the old bank 2 and 400 bytes from the old bank 3. Also, the new bank 3 may depend on the old banks 1 and 2, where the new bank 3 utilizes 20 bytes from the old bank 1 and 150 bytes from the old bank 2.

FIG. 3B shows a directed graph that illustrates the exemplary inter-dependencies relationships among the banks of FIG. 3A, in accordance with an embodiment of the present invention. Depending on oneself such as, for example, the new bank 1 depending on the old bank 1 may not cause a problem, as such, and self-loops such as, for example, self-loop 301 may be ignored. Similarly, self-loop 313 may also be ignored.

Figure 3C:
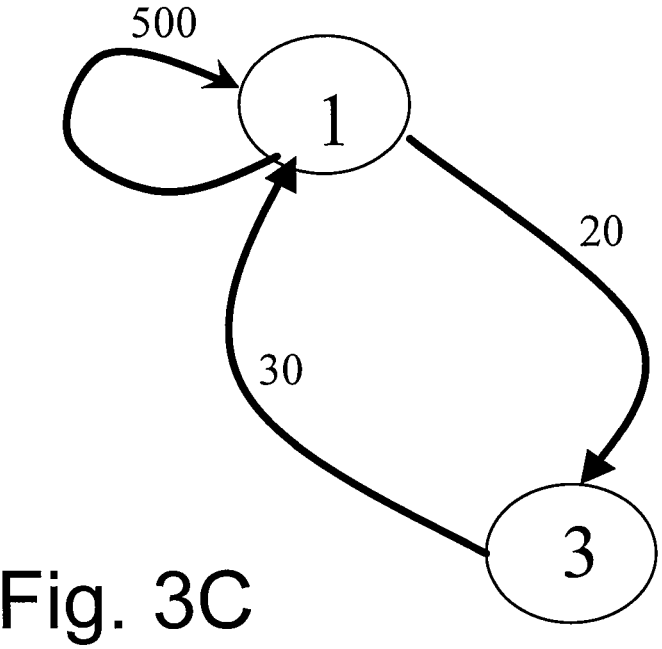
FIG. 3C shows a directed graph that illustrates an exemplary sub-graph from the directed graph of inter-dependent banks of FIG. 3B, in accordance with an embodiment of the present invention.

FIG. 3C shows a directed graph that illustrates an exemplary sub-graph from the directed graph of inter-dependent banks of FIG. 3B, in accordance with an embodiment of the present invention. The sub-graph may contain a subset of nodes with all the edges connecting them such as, for example, the nodes representing banks 1 and 3.

For example, let G={V,E} and G'={V',E'} be directed graphs comprising vertices (a.k.a., nodes) V and V', and edges E and E', respectively. Given a permutation P of the nodes of G, a subsequence P' of P is any subset of V that appear consecutively in P. For example, 235 and 516 are both subsequences of 423516. If the permutation P is optimal for G, then any of its subsequences P' is also optimal for G', the sub-graph derived from nodes in P'.

For example, for the illustration shown in FIG. 3C, there may be two possible bank orders. One possibility for the bank order is to first update bank 1, and then update bank 3. The cost for that bank order is 20 bytes of space in an update package. The second possibility for the bank order is to first update bank 3, and then update bank 1. The cost for that bank order is 30 bytes of space in an update package. Therefore, the optimal order for this example sub-graph is to update bank 1, and then update bank 3, or 1, 3.

In an embodiment of the present invention, once the optimal order is determined for a pair of nodes, other nodes may be added one at a time, by inserting the added node within the previously determined optimal bank order. For the above example, having an optimal order of 1, 3, the possible new optimal orders when adding a new bank 2 are: 2, 1, 3; 1, 3, 2; 1, 2, 3; and 3, 2, 1 (The bank orders 2, 3, 1 and 3, 1, 2 are not consistent with the initial optimal bank order of 1, 3, and are eliminated). The cost may then be determined for each combination as follows:

Cost(213)=400+150+20=570

Cost(132)=20+400=420

Cost(123)=20+150=170

Cost(321)=400+200+30=630

In an embodiment of the present invention, the optimal order may be the one with the lowest cost, which in the above example is 170, the cost for the bank order 1, 2, 3.

Figure 3D:
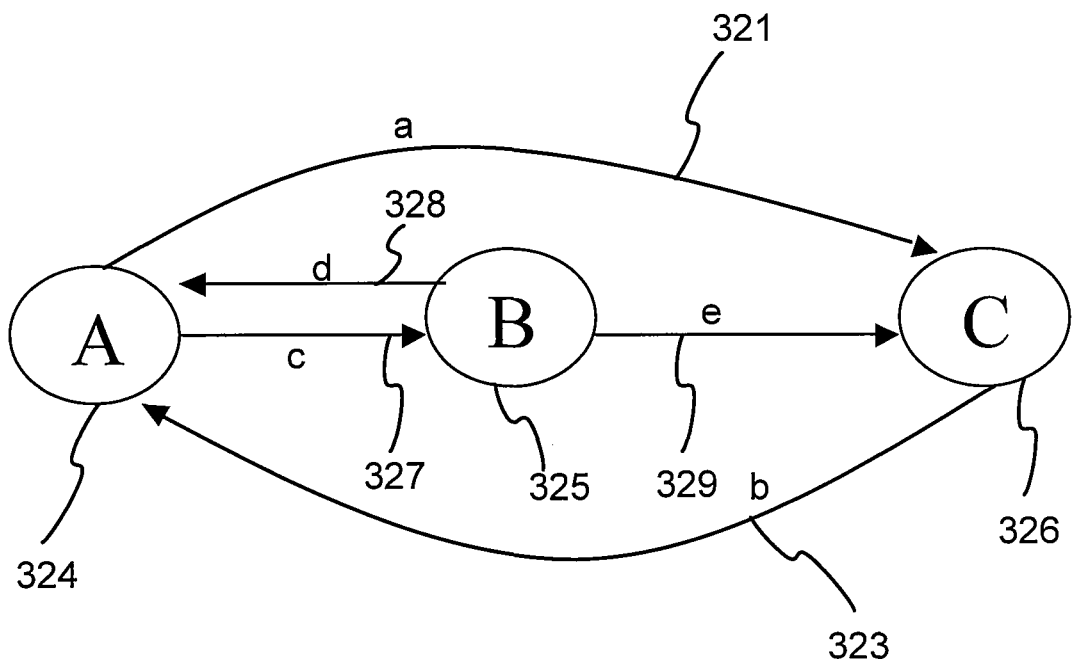
FIG. 3D shows a directed graph that illustrates nodes A, B, and C, having an in-order edge and an out-of-order edge, in accordance with an embodiment of the present invention.

A generic algorithm may be utilized for determining the optimal order for nodes $\{1, \ldots, k+1\}$ given the optimal order for nodes $\{1, \ldots, k\} = \{p_1, p_2, \ldots, p_k\}$. There are 2k possibilities for the order of nodes $\{1, \ldots, k+1\}$:

$k+1, p_1, p_2, \ldots, p_k$
$p_1, k+1, p_2, \ldots, p_k$
$p_1, p_2, k+1, \ldots, p_k$
...
$p_1, p_2, \ldots, k+1, p_k$
$p_1, p_2, \ldots, p_k, k+1$
$p_2, \ldots, p_k, k+1, p_1$
$p_3, \ldots, p_k, k+1, p_1, p_2$
...
$p_k, k+1, p_1, p_2, \ldots$ FIG. 3D shows a directed graph that illustrates nodes A 324, B 325, and C 326, having an in-order edge 321 and an out-of-order edge 323, in accordance with an embodiment of the present invention. The edges 321, 323, 327, 328, 329 of the weighted, directed graph shown in FIG. 3D have weights of a, b, c, d, and e, respectively. Given a weighted, directed graph such as that shown in FIG. 3D, an embodiment of the present invention may find the optimal permutation of nodes, such that the total weights on out-of-order edges such as, for example, out-of-order edge 323, is minimized.

Figure 4:
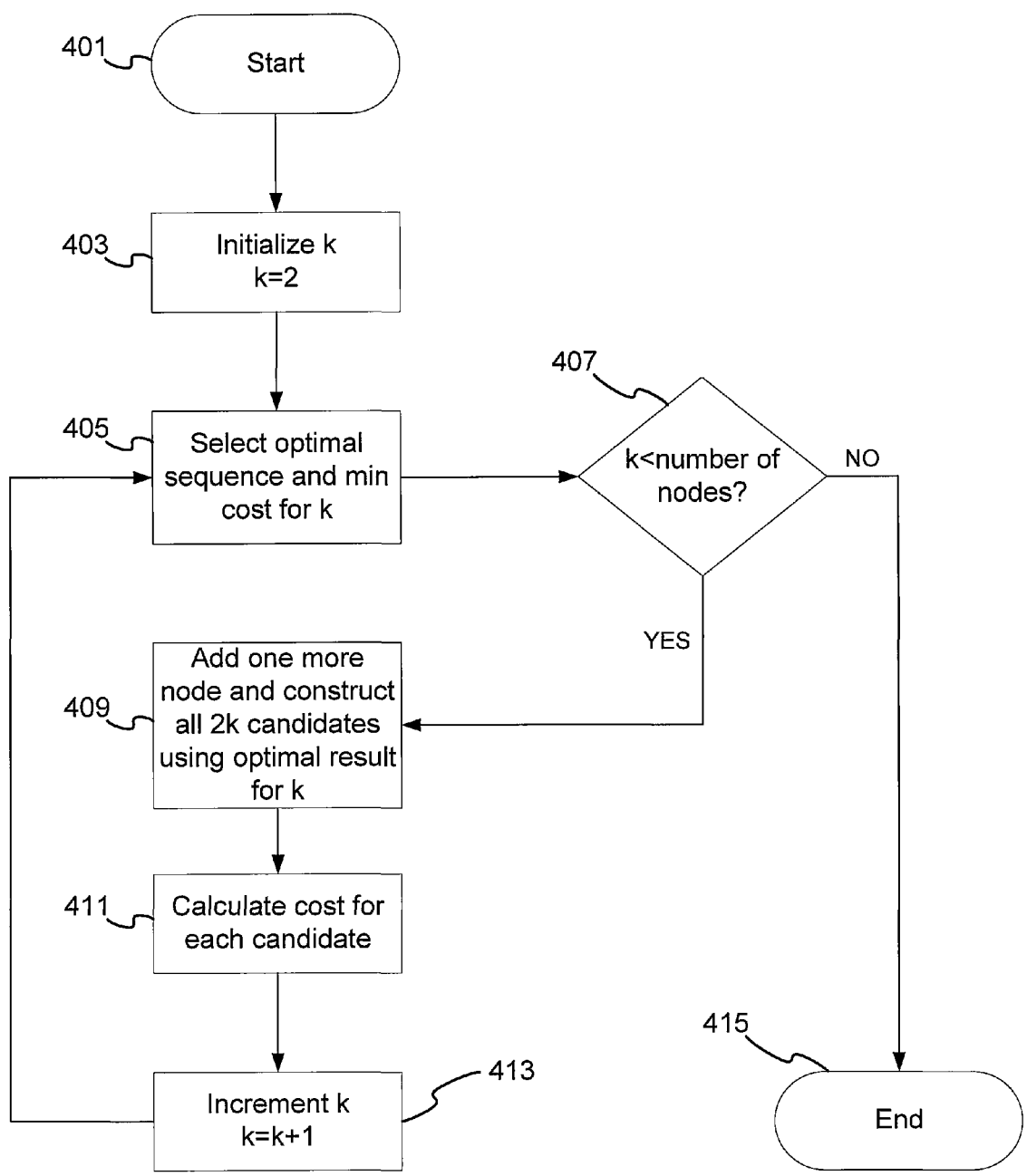
FIG. 4 illustrates a flow diagram of an exemplary algorithm for determining an optimal bank order, in accordance with an embodiment of the present invention.

FIG. 4 illustrates a flow diagram of an exemplary algorithm for determining an optimal bank order, in accordance with an embodiment of the present invention. Nodes may represent the banks graphically and the inter-dependencies among the banks to be updated may be represented as shown in FIG. 3B. The algorithm may be entered at a start block 401. At a next block 403, k may be initialized to 2, indicating 2 nodes. An optimal sequence with a minimum cost may be determined for the k nodes at a block 405. At a decision block 407 the number of nodes in the calculation, i.e. k, may be compared to the number of total nodes. If k is not less than the number of nodes, i.e. k is all the nodes, then the algorithm may jump to the end 415.

If k is less than the number of nodes, then at block 409 one more node may be added to the existing k nodes, and 2k permutations or sequences of the nodes may be constructed using the optimal result determined at block 405. The cost may then be calculated for each of the 2k sequences at block 411. The value of k may then be incremented by one at block 413, and the optimal sequence with the minimum cost may be determined at block 405. The algorithm may then go through all the nodes until the cost is determined using all the nodes, at which point the algorithm may end up with the optimal sequence that has the minimum cost.

The present invention may be realized in hardware, software, firmware and/or a combination thereof. The present invention may be realized in a centralized fashion in at least one computer system, or in a distributed fashion where different elements are spread across several interconnected computer systems. Any kind of computer system or other apparatus adapted for carrying out the methods described herein may be suitable. A typical combination of hardware and software may be a general-purpose computer system with a computer program that, when being loaded and executed, controls the computer system to carry out the methods described herein.

The present invention may also be embedded in a computer program product comprising all of the features enabling implementation of the methods described herein which when loaded in a computer system is adapted to carry out these methods. Computer program in the present context means any expression, in any language, code or notation, of a set of instructions intended to cause a system having information processing capability to perform a particular function either directly or after either or both of the following: a) conversion to another language, code or notation; and b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A communication device comprising:
    a communication interface for receiving a package of update information from a remote system; and
    at least one processor communicatively coupled to memory within or external to the at least one processor, wherein the memory is updated from a first version of code to a second version of the code as a plurality of banks, each bank comprising a plurality of contiguous memory locations,
    wherein the update package comprises difference information used to generate an updated bank of the second version using the first version of code and bank order information that specifies a bank order for generating each of the updated banks in a bank by bank fashion;
    wherein the difference information is encoded as a sequence of instructions for execution by code in the memory, and wherein the sequence of instructions comprises instructions of a first type that generate part of the updated second version of code using part of the first version of code and instructions of a second type that generate part of the updated second version of code from code in the package of update information; and
    wherein the bank order for updating the plurality of banks is optimized to minimize an amount of data associated with instructions of the second type, wherein the optimizing of the bank order includes:
        determining an optimal sequence for updating a subset of the banks of the plurality of memory banks;
        generating a new subset of the banks of the plurality of memory banks by adding a previously unselected memory bank to the subset of the banks of the plurality of memory banks; and
        determining an optimal sequence for updating the new subset of the banks of the plurality of memory banks.

2. The communication device of claim 1 wherein the communication interface receives the package of update information using a wireless network.

3. The communication device of claim 1 wherein the memory is semiconductor memory.

4. The communication device of claim 3 wherein the semiconductor memory is FLASH type non-volatile memory.

5. The communication device of claim 1 wherein the bank order information is determined by the remote system based on an amount of available memory in the communication device.

6. The device of claim 1, wherein the communication device is a wireless communication device, the communication device further comprising a receiver of the communication interface, wherein the receiver is configured to receive the package of update information from the remote system.

7. The device of claim 6, wherein the wireless communication device is a cellular telephone and the package of update information from the remote system is modulated and received by the receiver according to a wireless communication standard.

8. A method of updating memory in a communication device from a first code version to a second code version, the memory arranged as a plurality of banks, each bank comprising a plurality of contiguous memory locations, the method comprising:
    receiving a package of update information from a remote system, wherein the package of update information comprises difference information and bank order information that specifies a bank order for generating each of the updated banks; and
    generating each updated bank of the second version of code from the first version of code in a bank by bank fashion, using the difference information, according to the bank order information,
    wherein the difference information is encoded as a sequence of instructions for execution by code in the memory, and wherein the sequence of instructions comprises instructions of a first type that generate part of the updated second version of code using part of the first version of code and instructions of a second type that generate part of the updated second version of code from code in the package of update information; and
    wherein the bank order for updating the plurality of banks is optimized to minimize an amount of data associated with instructions of the second type, wherein the optimizing of the bank order includes:
        determining an optimal sequence for updating a subset of the banks of the plurality of memory banks;
        generating a new subset of the banks of the plurality of memory banks by adding a previously unselected memory bank to the subset of the banks of the plurality of memory banks; and
        determining an optimal sequence for updating the new subset of the banks of the plurality of memory banks.

9. The method of claim 8 wherein the communication device receives the package of update information using a wireless network.

10. The method of claim 8 wherein the memory is semiconductor memory.

11. The method of claim 10 wherein the semiconductor memory is FLASH type non-volatile memory.

12. The method of claim 8 wherein the bank order information is determined by the remote system based on an amount of available memory in the communication device.

13. A system that operates to update memory in a communication device from a first code version to a second code version, the memory arranged as a plurality of banks, each bank comprising a plurality of contiguous memory locations, the system comprising:
  one or more processors operably coupled to the memory and to interface circuitry for communicating over a network, the one or more processors operating to, at least:
    receive a package of update information from a remote system via the network, wherein the package of update information comprises difference information and bank order information that specifies a bank order for generating each updated bank;
    identify a not yet updated bank, in agreement with the bank order information;
    generate an updated second code version of the identified bank, using the first code version and the difference information; and
    in a bank by bank fashion, repeat identifying and generating, until all banks in the bank order have been updated to the second code version,
  wherein the difference information is encoded as a sequence of instructions for execution by code in the memory, and wherein the sequence of instructions comprises instructions of a first type that generate part of the updated second version of code using part of the first version of code and instructions of a second type that generate part of the updated second version of code from code in the package of update information; and
  wherein the bank order for updating the plurality of banks is optimized to minimize an amount of data associated with instructions of the second type, wherein the optimizing of the bank order includes:
    determining an optimal sequence for updating a subset of the banks of the plurality of memory banks;
    generating a new subset of the banks of the plurality of memory banks by adding a previously unselected memory bank to the subset of the banks of the plurality of memory banks; and
    determining an optimal sequence for updating the new subset of the banks of the plurality of memory banks.

14. The system of claim 13 wherein the communication device receives the package of update information using a wireless network.

15. The system of claim 13 wherein the memory is semiconductor memory.

16. The system of claim 15 wherein the semiconductor memory is FLASH type non-volatile memory.

* * * * *